Jan. 31, 1967   R. N. SUMMERGRAD   3,301,638
METHOD OF PREPARING ALUMINUM ARSENIDE
Filed Aug. 21, 1964
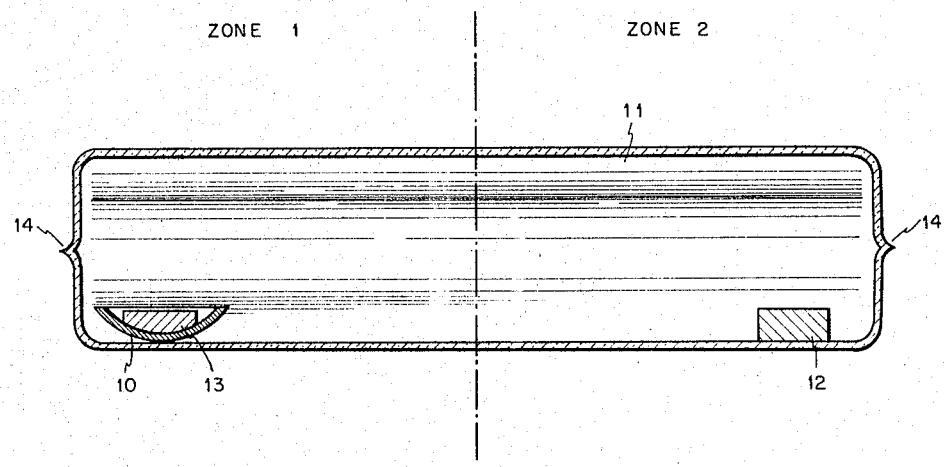
INVENTOR.
RUBIN N. SUMMERGRAD
BY
R. J. Frank
ATTORNEY.

United States Patent Office

3,301,638
Patented Jan. 31, 1967

3,301,638
METHOD OF PREPARING ALUMINUM ARSENIDE
Rubin N. Summergrad, Glen Cove, N.Y., assignor to General Telephone and Electronics Laboratories, Inc., a corporation of Delaware
Filed Aug. 21, 1964, Ser. No. 391,253
2 Claims. (Cl. 23—204)

This invention relates to the preparation of high purity aluminum semiconducting compounds at low temperatures, and in particular to the preparation of high purity aluminum arsenide.

The preparation of the semiconducting compound aluminum arsenside (AlAs) presently requires either the direct combination of aluminum and arsenic at high temperatures or the passage of a gas, such as hydrogen, $H_2$, plus arsenic trichloride, $AsCl_3$, over heated aluminum to form aluminum arsenide by a vapor phase reaction.

It has been found that the first method, the direct combination of the elements, does not go to completion unless the melting point of the aluminum arsenide compound is attained. This temperature is quite high, about 1700° C., and the aluminum arsenide has been found to react with the walls of the containers when so heated. Due to these high temperature reactions, the prepared compound contains significant amounts of undesired impurities and occlusions. Also, aluminum powder is employed as the starting material to maximize the surface area of the charge, which, in turn, increases the quantity of aluminum oxide present during the reaction.

The second method, utilizing the passage of a gas comprised of hydrogen and arsenic trichloride over heated aluminum, suffers from the complications generally found in open or flowing systems, such as the regulation of the rate of flow and the purification of the flowing gas. In addition, these involve the handling of hygroscopic materials, such as $AsCl_3$, which must be maintained in a moisture-free condition. Further, this method utilizes a transport process in which aluminum arsenide is formed during a vapor phase reaction and the end product is difficult to collect.

Accordingly, an object of the present invention is the provision of a method wherein high purity aluminum arsenide is prepared at low temperatures.

Another object is to provide a method for preparing aluminum arsenide in a closed system and thereby obviating the need for the peripheral equipment needed in forming aluminum arsenide in an open or flowing system.

A further object is the provision of a method wherein the reaction of aluminum and arsenic can go to completion without requiring the compound to be heated to its melting temperature of about 1700° C.

Still another object is to provide a method of preparing high-purity aluminum arsenide in which the resulting product can be conveniently collected.

In accordance with the present invention, the semiconducting compound of aluminum arsenide is prepared in a sealed tube by reacting aluminum and arsenic in the presence of a halogen, such as iodine, at temperatures of about 700° C. The presence of the halogen allows the reaction to go to completion without requiring the temperature to be raised to the melting point (1700° C.) of the compound.

Normally, when the aluminum is heated to a temperature lower than the melting point of the aluminum arsenide, a surface coating of aluminum arsenide is formed about the aluminum charge preventing further reaction. The resultant end product has therefore contained regions of pure aluminum. However, at temperatures of the order of 1700° C., the aluminum arsenide, or melts containing it, react with commercially available containers to introduce impurities in such quantity that the resultant product is often unsuitable for use in semiconductors. The present method enables the reaction to go to completion at low temperatures of about 700° C. so that the reaction with the containers is significantly reduced and the resultant compound is of high purity.

In the present invention, the compound is formed by placing a solid aluminum charge in an aluminum oxide boat and sealing it in a quartz tube containing both a halogen gas and solid arsenic. The boat is positioned proximate one end of the tube with the arsenic situated at the opposite end. The tube is then differentially heated with the end containing the boat being heated to a temperature within the range of 660° to 950° C. and the arsenic end being heated to about 600° C. The differential heating permits the pressure of the arsenic in the sealed tube to be readily controlled by controlling the temperature of the solid arsenic. A pressure of about one atmosphere is found sufficient to maintain the reaction and thus the problem of exceeding the strength of the quartz tube is obviated.

The temperature was maintained for a period sufficient to permit the reaction to go to completion. The time of completion is determined by the physical appearance of the material contained in the boat. Upon cooling, the boat contains high purity aluminum arsenide substantially uncontaminated by impurities, such as silicates and occlusions.

Further features and advantages of the method will be more readily apparent from the following description of the steps therein, when taken in conjunction with the accompanying drawing in which the figure is a side view in cross-section of the apparatus employed in the present invention.

Referring to the figure, a boat 10 formed of aluminum oxide is shown positioned at or near one end of a silica or quartz tube 11. The boat contains a charge of solid aluminum. A charge of arsenic 12 is placed at the opposite end of tube 11. The amount of arsenic is in excess of the stoichiometric amount required to permit the reaction to go to completion for the particular charge of aluminum used. This insures that sufficient arsenic is available in the tube to maintain the reaction. The tube 11 is then evacuated, filled with a halogen, such as iodine, and sealed at its ends 14.

The portion of the tube containing the boat (zone 1) is heated to a temperature within the range of 660° to 950° C. The other zone containing arsenic is heated to approximately 600° C. to maintain the pressure of the arsenic vapor, formed due to the heating of the tube, within the range of 0.1 to 2 atmospheres. The arsenic pressure of about 1 atmosphere is preferred for normal operation. The heating can be readily performed by using conventional resistance heaters. It is to be noted in connection with the above temperature range that the lower the operating temperature employed, the higher the purity of the resultant product. The preferred operating temperature is found to be about 700° C.

The arsenic vapor reacts with the aluminum to provide a powder of aluminum arsenide. As the arsenic reacts to form the compound, additional amounts of the arsenic charge 12 are vaporized permitting the reaction to continue.

It has been found that as the arsenic reacts with the aluminum contained in boat 10, the surface coating normally formed thereon when the temperature is maintained below the melting point of the aluminum arsenide compound is broken down by the presence of the halogen. Thus, the arsenic is permitted to react with the entire mass of the aluminum, and the reaction goes to completion forming a powder of aluminum arsenide. The physical appearance of the end product is a brownish powder, as opposed to the shiny surface of the aluminum metal charge and indicates when the reaction is completed.

The temperatures of tube 11 are maintained for a period sufficient to permit the reaction to go to completion. The actual period depends on the size of the aluminum charge, and for a charge of 5 grams heated to about 700° C., a period of 48 hours was found sufficient. The tube is then cooled by removing the heating source and exposing the tube to room temperature. The rate of cooling is not critical. The tube is then opened and the boat containing the aluminum arsenide powder is removed.

The high temperature reactions previously employed promoted the reaction of the arsenic vapor with the silica envelope generally employed as the container. As a result, the aluminum arsenide so formed contained significant amounts of silicon. However, at the temperatures employed in the present invention, the reaction between the arsenic vapor and sealed tube 11 is appreciably lessened such that the resultant compound has been found to contain silicon impurities of only about 10 parts per million. Thus, the aluminum arsenide so formed is of semiconductor purity and is well suited for succeeding operations such as epitaxial growth on a suitable substrate.

While the above description has referred to specific steps and apparatus, it will be understood that departures may be made therefrom while still remaining within the spirit and scope of the invention.

What is claimed is:

1. The method of preparing high-purity aluminum arsenide by the reaction of aluminum and arsenic which comprises the steps of placing a charge of aluminum in an aluminum oxide boat, inserting said charge and boat in a silica tube, placing a charge of arsenic in excess of the amount required to permit the reaction to go to completion in said tube, filling said tube with halogen gas, sealing said tube, heating the portion of said tube containing said aluminum to a temperature of about 700° C., heating the portion of said tube containing said arsenic to a temperature of about 600° C., said halogen gas acting to break down the protective coating formed on the heated aluminum and thereby permitting the reaction to go to completion, cooling said tube and opening said tube to remove the aluminum arsenide therefrom.

2. The method in accordance with claim 1 in which said halogen gas comprises iodine gas.

References Cited by the Examiner
UNITED STATES PATENTS

| | | | |
|---|---|---|---|
| 3,094,387 | 6/1963 | Williams | 23—204 |
| 3,206,406 | 9/1965 | Barkemeyer et al. | 252—62.3 |

OSCAR R. VERTIZ, *Primary Examiner.*

H. S. MILLER, *Assistant Examiner.*